United States Patent [19]

Fullaway

[11] 3,812,951
[45] May 28, 1974

[54] LOG HANDLING APPARATUS

[75] Inventor: Altan Vanstone Fullaway, Aberdeen, Wash.

[73] Assignee: Weyerhaeuser Company, Tacoma, Wash.

[22] Filed: May 16, 1972

[21] Appl. No.: 253,747

[52] U.S. Cl. ..................... 198/34, 198/26, 214/1 P, 83/102, 83/158, 83/159
[51] Int. Cl. .......................................... B65g 47/26
[58] Field of Search .............. 198/26, 34, 221, 218; 83/102, 102.01, 102.1, 109, 157–160; 214/1 P

[56] References Cited
UNITED STATES PATENTS

| | | | |
|---|---|---|---|
| 2,710,104 | 6/1955 | Putnam | 198/26 |
| 2,985,282 | 5/1961 | Elworthy | 198/221 |
| 3,330,401 | 7/1967 | Ahlstedt | 198/26 |
| 3,355,042 | 11/1967 | Mellott et al. | 198/34 |

*Primary Examiner*—Evon C. Blunk
*Assistant Examiner*—Joseph E. Valenza

[57] ABSTRACT

A bucking and log handling apparatus has a bucking station where log stems are cut to at least one desirable length. Positioned transversely from the bucking station are at least two axially spaced holding stations with means associated with one holding station to move the log segment axially. The holding stations provide temporary support for the log segments until they are called for downstream at which point the holding function is removed and the log segments fall into the outflow conveyor system. A reject mechanism allows any undesirable log segment to be removed from the system.

6 Claims, 3 Drawing Figures

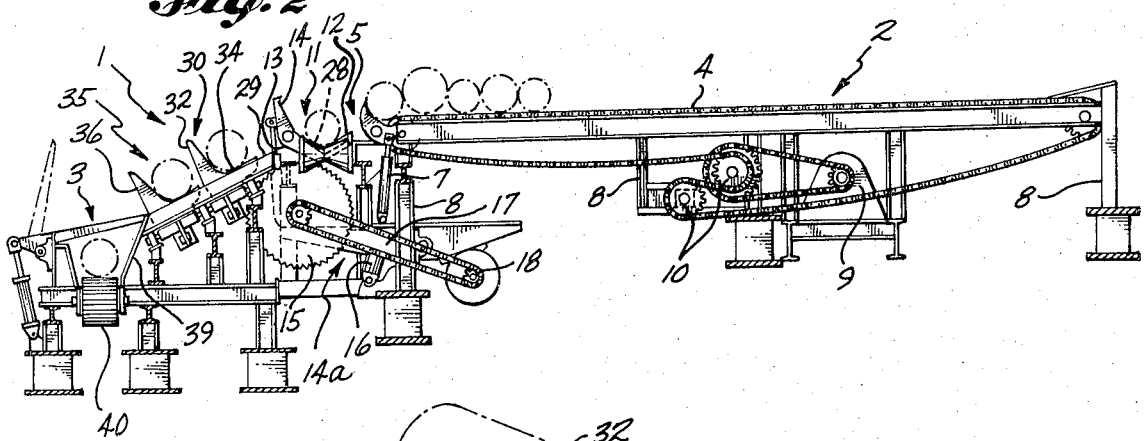
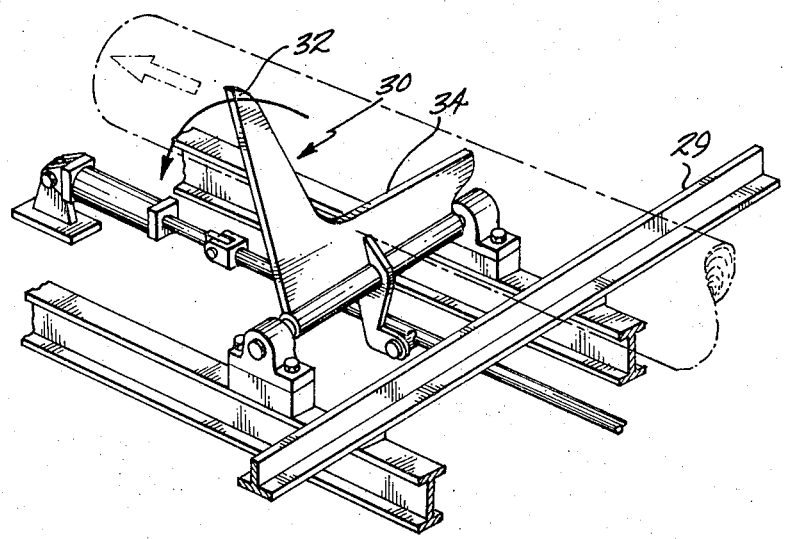

LOG HANDLING APPARATUS

BACKGROUND OF THE INVENTION

The present invention relates generally to a machine for bucking and handling log segments and, more particularly, to one where log segments are handled so that they are continually fed to a downstream process with a predetermined gap between each bucked segment.

It is a well known fact in the forest products industry and elsewhere that virgin stands of timber are rapidly being depleted and as reforestation is carried out, the second growth timber on harvesting will generally be of smaller diameter. In the coming years, the forest products industry will necessarily be required to design log conversion and handling machinery that accounts for this smaller diameter log and the log segments. In order for production standards to be maintained, it is readily apparent that certain procedures and actions must be undertaken. The basic premise in log conversion when the diameters become smaller, is that in order to maintain present levels of production, the smaller diameter logs will have to be processed at a faster rate. Alternate steps are being taken to increase yields for a given log segment, but the present invention relates more to increasing the feed rate of the smaller logs to a downstream conversion process.

As these smaller diameter logs come from the sorting yards where they are first taken after being harvested, it is generally the practice to buck them into manageable lengths. Various methods for bucking the logs into manageable log segments are utilized, but probably the most common is where the individual full length logs or partially trimmed logs are loaded onto a deck having a transversely moving conveyor system to transport the logs to the bucking station where the logs are then cross cut or bucked into the standard manageable lengths. The purpose in bucking a log is generally to produce a standard length segment for further processing.

The normal and standard downstream processes that convert the log after it has been bucked are concerned primarily with producing lumber. Examples of well known downstream conversion processes are: the standard band saw, the quad saw, canters, specialty type machines for breaking down the axially moving log segment, and others.

As previously mentioned, since the log diameters are becoming smaller, it is necessary that the downstream conversion processes produce the usable end products (lumber, chips, etc.) quickly, efficiently and at a low dollar cost. Most downstream processes have a rated value for accepting log segments and processing them. It therefore becomes desirable when processing the smaller log segments to have them travel through a given downstream process at a fast throughput rate, thereby utilizing the downstream process machinery to its fullest extent and capacity.

Accordingly, from the foregoing, one object of the present invention is to provide an apparatus that handles log segments, delivering them to a downstream process at the maximum throughput rate of the downstream converting machinery.

Another object of the present invention is to provide a uniform gap between adjacent log segments as they travel into the downstream converting process.

Yet a further object of the present invention is to provide a surge capacity and holding capability for the log segments in order to maintain the continuous flow to the down-stream process while the bucking saw operator makes his cutting decision.

These and other objects of the invention will become apparent upon reading the following specification in conjunction with the attached drawing.

SUMMARY OF THE INVENTION

Briefly, this invention is practiced in one form by providing a plurality of log segment temporary holding stations transversely downstream from a bucking station where the log stem is cross cut into at least two segments. At least one of the holding stations has means to move a log segment axially so as to establish a predetermined gap between adjacent log segments. A cascading effect is provided with reject means at the bottom thus offering a surge capacity for the downstream process and allowing the human operator time to make his cutting decision.

BRIEF DESCRIPTION OF THE DRAWING

FIG. 2 is a full cross-sectional elevation view of the present invention taken along lines II—II of FIG. 1.

FIG. 3 is a detailed isometric view showing a portion of the gap establishing means in the present invention.

DESCRIPTION OF THE PREFERRED EMBODIMENT

Figure 1:
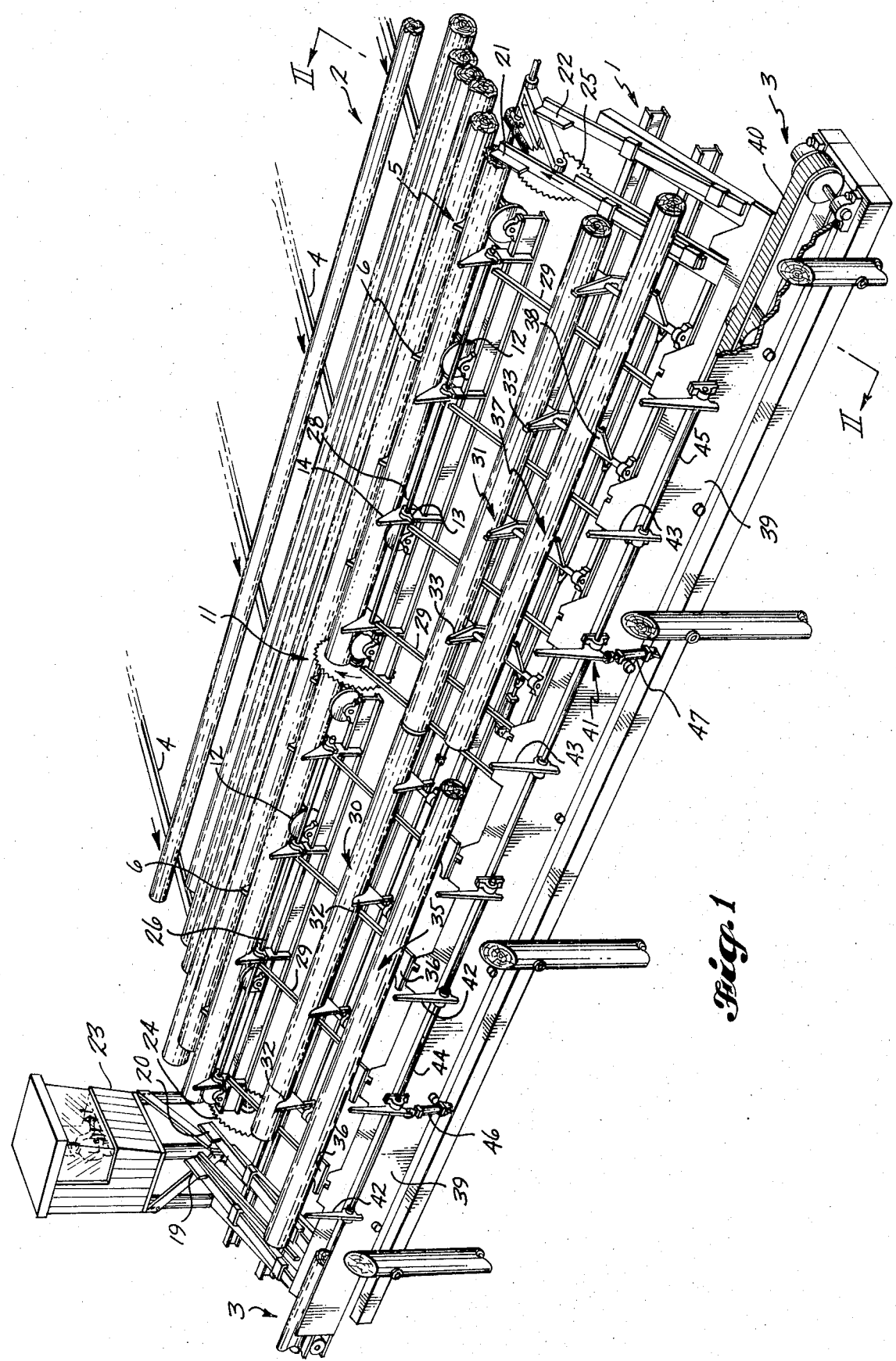
FIG. 1 is a perspective view showing the log handling apparatus comprising the present invention.

Referring now to the figures of the drawing and first to FIG. 1, the overall bucking and log handling apparatus which is the subject matter of the present invention is generally indicated at 1. It is the log handling apparatus 1 that accomplishes the aforementioned objects of the present invention.

In relation to the flow of logs in the overall process, the loading deck area generally indicated at 2 is at a position upstream from the log handling apparatus 1. At a position downstream from the log handling apparatus 1 is the outflow conveyor system generally indicated as 3, which operates to carry the bucked log segments into the downstream converting process (not shown).

Before proceeding further with the detailed description of the invention, a description will be given of the path that a log stem follows as it travels over the deck area 2 through the log handling apparatus 1 and then to the downstream process by way of the outflow conveyor system 3. The individual small logs varying in length are singulated at the input end of the loading deck area 2 and are appropriately orientated in order to travel transversely along the conveyor system 4. The conveyor system 4 is generally in a horizontal plane such that as the individual log stems traverse the loading deck area 2 the direction of the gravity force on each log is substantially downward with no tendency of the logs to roll.

At the end of the conveyor system 4 is a standard log stop and loader system indicated generally as 5 (FIG. 2) whereby a single log can be charged transversely to the log handling apparatus 1. Log stop and loaders are of course well known in the art and are comprised simply of upwardly extending rotatably mounted arm members 6 that are controlled by actuating cylinders 7. Arms 6 are normally in an up position in order to hold the logs on the conveyor system 4. However, when the actuating cylinders 7 rotate the arms downwardly, a single log stem will be charged into the downstream log handling apparatus 1. Standard log stop and loaders normally operate on a principle of gravity fall whereby as the arms 6 are rotated downwardly, the log stem will naturally roll downwardly due to its weight. It should thus be appreciated that the next downstream station will normally be slightly displaced in the vertical direction from the log stop and loader system 5. Of course, it is necessary to support the conveyor system 4 and the log stop and loader system 5 at the proper vertical position and this is accomplished by means of a plurality of appropriately spaced and erected frame members designated collectively as 8.

Providing the motivating power for the transverse movement of the logs over the loading deck area 2 is a suitable driving motor 9 and gear assembly 10 that operates to drive conveyor system 4.

Reference has been made to a downstream station immediately adjacent the log stop and loader system 5 and in the present invention the first downstream station in the log handling apparatus 1 is one that bucks the log stem and also has the capability of making trim cuts at either end of a stem. The bucking station depicted generally as 11 again is of a standard design and is comprised of a roll case apparatus having a plurality of hourglass rolls 12 appropriately positioned to accept the incoming log stem from the log stop and loader system 5. As the log stems roll gently downward and into the hourglass rolls 12, their motion is generally halted by the inclined sides of the hourglass rolls 12 and, in addition, a plurality of kicker arms 13 have an upwardly extending portion 14 thereon that act as additional stop means, should any downwardly falling log stem roll over its intended position within the hourglass rolls 12. The hourglass rolls 12 are powered by any suitable means (not shown) such that a log stem can be moved longitudinally in either direction at bucking station 11.

Positioned approximately midway between the end two hourglass rolls 12 is the bucking saw system generally depicted as 14a. The saw system 14a utilizes a circular saw 15 that is mounted beneath the bucking station 11 and has means provided that enable it to pivot upwardly and through a log stem that is resting in the hourglass rolls 12. The circular saw 15 is positioned so as to buck the individual log stem into two desirable lengths. The means for pivoting the circular saw 15 through the log stem is comprised of an actuating cylinder 16 and arm member 17, which is pivotally mounted about point 18. The circular bucking saw 15 is driven by any suitable means. In the normal moe of operation, the peripheral saw speed in conjunction with the weight of the log stem will be sufficient to allow the saw 15 to make a clean bucking cut through the stem.

Prior to actuating the bucking saw system 14a, the hourglass rolls 12 are actuated to move the log stem longitudinally to a position whereby one end of the log stem abuts a suitable log stop. A plurality of log stops indicated as 19, 20, 21 and 22 are positionable at either end of the hourglass rolls 12 in order to buck the log stem into at least one suitable standardized length (16' and 20'). For example, in a standard arrangement, the pair of stops 19 and 20 and 21 and 22 would be arranged whereby stops 20 and 21 would offer a 16-ft. log segment after bucking, while stops 19 and 22 would offer 20-ft. log segments. These lengths are to be taken by way of example only and are not intended to limit the scope of the present invention. Depending upon the quality of the total log stem, the correct stop is appropriately actuated.

In order to control the actuation of the bucking saw system 14a and the movement of log stops 19, 20, 21 and 22, a human operator necessarily must make the decisions. One advantageous position for th operator is to one side of the bucking station 11 in a booth depicted as 23 where suitable controls are positioned. From this vantage point, the operator can quickly scan each incoming log stem and determine which log stop should be actuated. He then actuates the appropriate log stop together with the plurality of hourglass rolls 12 to properly position a log prior to actuation of the circular bucking saw 15.

Positioned at either end of the hourglass rolls 12 and in close proximity to log stops 20 and 21 are a pair of trim saws 24, 25 which are actuable in a manner similar to the circular bucking saw 15, such that either end of the log stem may be trimmed off prior to further processing. Trim saws 24 and 25 therefore operate to remove the excess end of the log stem that extends beyond the respective log stops.

At this point in the processing of the log stem, the plurality of hourglass rolls 12 would normally be actuated to carry the two log segments axially to a conveyor system for carrying the segments to the downstream processing station. It is at this point where the structure of the present invention operates to further handle the log segments prior to allowing them to be fed into the downstream processing station. As previously mentioned, a plurality of kicker arms 13 operate in conjunction with the hourglass rolls 12 to impede the downward movement of the log stem as it is charged into the hourglass rolls 12. In addition to offering the aforementioned function, the kicker arms 13 are also powered in order to rotate about the axes 26 and 27. The plurality of kicker arms 13 on either side of the circular saw 15 can operate independently of the other side, although for most purposes they operate together. Extending beneath each log segment and comprising a part of the kicker arm 13 is the riser arm portion 28 that operates to lift the log segment from the hourglass rolls 12 and as the kicker arms rotate they allow the log segement to roll from the kicker arms 13 and generally downward and transversely, as will be presently described.

Extending transversely and at an angle that is inclined downwardly from the horizontal plane through the bucking station 11 are a plurality of decline skids, each indicated as 29. Of course it will be appreciated that as the kicker arms 13 drop the log segments downwardly the decline skids 29 will act as their vertical support. Positioned slightly below and transversely downstream from the bucking station 11 are a pair of axailly spaced temporary holding stations depicted generally at 30 and 31. The holding statins 30, 31 are comprised of a plurality of stop arms; those operating to stop and hold the log segment coming to rest at holding station 30 being indicated as 32, while the stop arms operating to hold the log segment at holding station 31 are indicated as 33. When the plurality of stop arms 32 and 33 are in their up position, they operate to halt the downwardly falling log segment at the two holding stations 30, 31. Those stop arms 33 at holding station 31 allow the log segments to rest on the decline skids until further actuation of the stop arms. At the holding station 30, the plurality of stop arms 32 are modified in order to accomplish some of the objects of the present invention. As may be seen clearly by referring to FIG. 3, the stop arms 32 have cradle portions depicted as 34 that are displaced vertically slightly above the plane of the decline skids 29. It is apparent that kicker arms 13 allow the respective log segments to roll gently downward into the cradle portions 34 and rest therein rather than on the decline skids 29.

Both sets of stop arms 32 and 33 have means to pivot them in an axial direction and downwardly so as to withdraw their support function from the held log segments. As the stop arms 33 holding one of the log segments pivot downwardly, removing the support from the log segment, the particular log segment will then be allowed to fall further downwardly along the decline skids 29 to a similar downstream holding station 35 having a similar set of stop arms indicated as 36, where the log segment may be held for an additional period of time prior to further travel. As the stop arms 32 with their attendant cradle portions 34 pivot downwardly and in an axial direction away from holding station 31, it will be appreciated that since the cradle portions 34 are slightly above the decline skids 29, the particular log segment will be moved in an axial direction, while at the same time, the stop arms are being removed from their holding position relative to the log segment. In this manner, a predetermined gap is established between the two axially spaced log segments. As the stop arms 32 pivot out of the way and create the gap, the particular log segment will be placed onto the decline skids 29 where it will then be allowed to roll gently downward to a similar downstream holding station depicted as 37 having stop arms 38. At station 37 the stop means 38 are similar to those of holding stations 31 and 35. The plurality of stop arms of the two axially spaced downstream holding stations 35 and 37 are also provided with means to pivot them downwardly on a proper command signal so as to remove them from a supporting function to the two log segments. After the two log segments have fallen into the holding stations 35 and 37, the predetermined axial gap has been established.

At this point, the two log segments are ready to be released onto the outflow conveyor system 3. If both log segments are suitable for the downstream converting process, the plurality of stop arms 36 and 38 will pivot downwardly, allowing the segments to roll downwardly along the decline skids 29 into a generally U-shaped conveying trough 39, having a suitable conveying means 40 positioned at the bottom thereof. These log segments are then carried axially downstream toward the processing station.

As a result of previously establishing the predetermined gap between the log segments, it will be appreciated that there will be less likelihood of the logs running into each other as they fall into the next downstream station. Recognizing the fact that certain log segments will be unsuitable for further processing, a reject system must necessarily be provided which is indicated generally at 41. The reject system 41 is comprised of a plurality of reject arms, those corresponding with holding stations 30 and 35 being designated as 42, while those operating in conjunction with holding stations 31 and 37 being indicated as 43. The reject arms 42 and 43 are operable independently of each other, and are adapted to pivot with, and about two rotatable axial shaft 44 and 45, respectively. To accomplish this movement, a pair of actuating cylinders 46 and 47 operate to turn the reject arm 42 and 43 on the respective shafts 44, 45. The reject arms 42 and 43 are constructed so that when it is desired to reject one of the downwardly rolling log segments, the actuating cylinders 46 and 47 can position the arms across the top of the U-shaped conveying trough 39 and allow the respective log segment to continue rolling over the tops of the reject arms. In this manner, the particular log segment is not allowed to fall onto the conveying means 40 but rather is rejected as being an undesirable segment for further immediate processing.

By referring specifically to FIG. 3, it will be apparent that the predetermined axial gap between adjacent log segments is determined by how far the cradle portions 34 of the stop arms 32 extend vertically above the plane of the decline skids 29. This distance, depending on the desired predetermined gap, can be easily determined by simple known methods of trigonometry where the total length of the stop arms is known and a predetermined gap to be established is given.

OPERATION OF THE INVENTION

Turning now to a precise description of the operation, it is readily apparent that the human operator in booth 23 has the capability through an appropriate control system for operating the present invention. Assuming first that no logs are within the log handling apparatus 1 but that a log supply is on the deck area 2, the operator first actuates the log stop and loader system 5, charging a single full-length log stem into the bucking station 11 and within the hourglass rolls 12. The operator then makes his bucking decision and appropriately positions the plurality of log stops 19, 20, 21 and 22. At this point, he actuates hourglass rolls 12 to carry the log so that it abuts the appropriate log stop. The several saws are then actuated to carry out the bucking step and trimming operations, if desired. The kicker arms 13 are then actuated, dropping the two log segments into the axially spaced holding stations 30 and 31. After the kicker arms 13 return to their initial position, the log stop and loader system 5 charges another log stem into the bucking station 11, while at the same time the first two bucked log segments are dropped into holding stations 35 and 37 since they are empty. As the stop arms 32 pivot downwardly and axially out of the way, the predetermined gap is established between the first two log segments. Again, the operator makes his bucking decision for the second log stem and after the bucking step is carried out, the kicker arms 13 are actuated allowing the bucked log stem (the second two log segments) to fall into the downstream holding stations 30 and 31. At this point electric eyes signal the stop arms of holding stations 35 and 37 to pivot and release their log segments into the U-shaped conveying trough 39. When the holding stations 35 and 37 return to their upright positions a signal tells the upstream stations that they are empty and are ready to accept other log segments. Another log stem is charged into the bucking station and this cycle is continued. As the last end of the log segment then in the conveyor system 3 clears the end of the holding station 37, a suitable electric eye will signal the stop arms at holding stations 35 and 37 to drop another two log segments. Upon reaching full operation the log handling apparatus will keep the outflow conveyor system full thereby transporting the log segments to the downstream process at a maximum throughput rate.

It will thus be appreciated that the present invention provides for a continuous flow of bucked log segments to a downstrea process while allowing a human operator sufficient time to make the appropriate bucking and trimming decision.

While a detailed example of the principal embodiment has been described, it is understood that many changes and modifications may be made in the above described log handling apparatus without departing from the spirit of the invention. All such modifications are intended to be included within the scope of the appended claims.

What is claimed is:

1. A log handling apparatus comprising:
   means to feed at least two axially spaced but substantially abutting log segments in a direction generally transverse to their longitudinal axes,
   a first pair of axially spaced means positioned transversely from said feed means being arranged and adapted to accept and hold the transversely fed log segments,
   means to support said log segments as they move from said feed means to said first pair of axially spaced accepting and holding means,
   at least one of said axially spaced accepting and holding means having means for moving one of said log segments in the axial direction away from the other thereby establishing a predetermined axial gap between the log segments, and
   said first pair of axially spaced accepting and holding means having means to release said log segments after actuation of said gap establishing means being arranged and adapted to allow the log segments to move in a direction generally transverse to their longitudinal axes.

2. The log handling apparatus as in claim 1 in which said first pair of axially spaced accepting and holding means are comprised of a plurality of stop arms arranged and adapted to extend upwardly from said support means so as to stop and hold the log segments from tranverse movement.

3. The log handling apparatus as in claim 1 in which said gap establishing means is comprised of a plurality of axial pivotal cradles associated with said one accepting and holding means that extend a predetermined vertical distance above the plane of said support means and arranged and adapted to hold said log segments above the support means until said cradles pivot downwardly to a position below said support means thereby moving said log segment axially from the other.

4. The log handling apparatus as in claim 1 in which said support means are comprised of a plurality of inclined skid members extending from said feed means to said first pair of axially spaced accepting and holding means.

5. The log handling apparatus as in claim 1 in which said release means is comprised of a plurality of pivotally mounted upwardly extending stop arms arranged and adapted to be pivoted downwardly to a position below the plane of said support means.

6. The log handling apparatus as in claim 1 further comprising:
   a second pair of axially spaced accepting and holding means positioned tranversely from said first pair being arranged and adapted to accept and temporarily hold the log segments having the predetermined gap therebetween,
   means to support said log segments as they move from said first pair into said second pair, and
   means to release said log segments from said second pair being arranged and adapted to allow the log segements to move in a direction geneally tranvsese to their longitudinal axes.

* * * * *